Dec. 23, 1958  S. E. PROCTOR  2,865,621
TOOL-CARRYING CHAINS
Filed Jan. 10, 1956  2 Sheets-Sheet 1
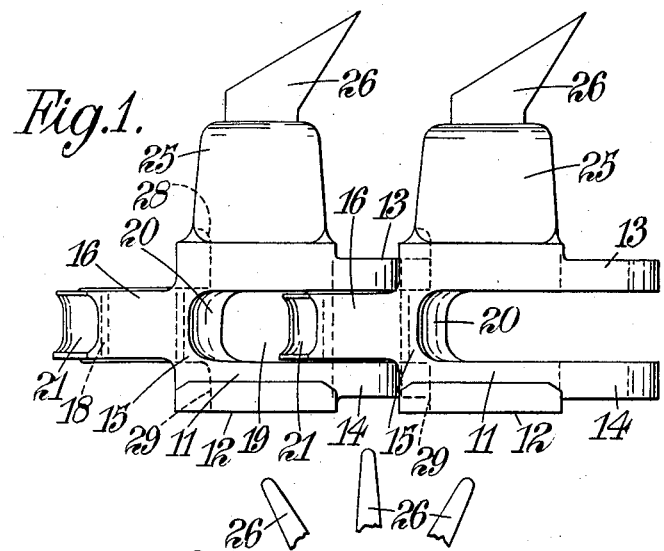
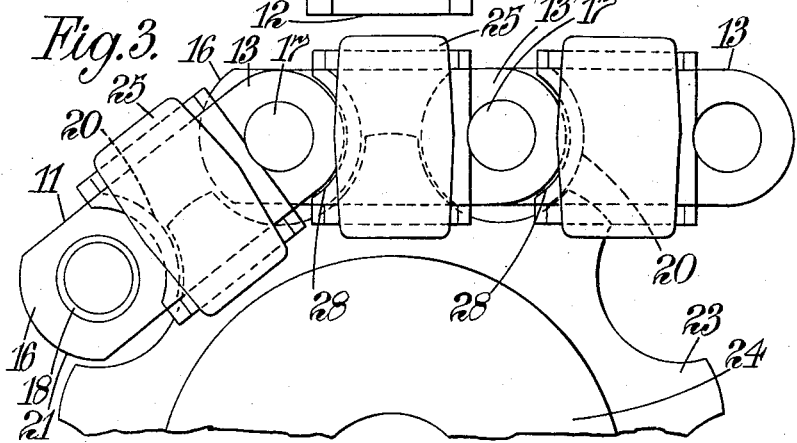
INVENTOR
SIDNEY E. PROCTOR
By Watson, Cole, Grindle & Watson
ATTORNEYS Dec. 23, 1958 S. E. PROCTOR 2,865,621
TOOL-CARRYING CHAINS
Filed Jan. 10, 1956 2 Sheets-Sheet 2

INVENTOR
SIDNEY E. PROCTOR
By
Watson, Cole, Grindle & Watson
ATTORNEYS

United States Patent Office 2,865,621
Patented Dec. 23, 1958

2,865,621

TOOL-CARRYING CHAINS

Sidney Ernest Proctor, Aylesbury, England, assignor to Austin Hoy and Company Limited, Aylesbury, England, a British company Application January 10, 1956, Serial No. 558,361

Claims priority, application Great Britain February 22, 1955

1 Claim. (Cl. 262—33)

This invention comprises improvements in or relating to tool-carrying chains (such as are used for coal cutting) of the type wherein the links have guide means on their bases to run in a jib or like guide, tool-carrying bosses on their upper parts, means to connect the links together and sprocket-engaging faces spaced apart from one another to receive the teeth of a driving sprocket between them.

In coal-cutter chains such as are above referred to, it is usual for the sprocket-engaging faces to be formed in the base of the chain and for the means which connect the links together to be such as to permit bending of the chain round the sprocket which engages the base. An ordinary coal-cutter chain operates around the periphery of a flat jib and the tool-carrying bosses carry tools which operate substantially in the plane of the jib but project above and below the jib so that the tools cut out an opening in the coal which is traversed by the jib as cutting proceeds. The chain in the known constructions has to pass round the whole periphery of the jib as well as round the sprocket, and the sprocket and jib operate in the same, or in certain cases in parallel planes, the chain bending in the same plane as the periphery of the jib and the plane of the sprocket. It is an object of the present invention to provide a chain which can be driven by a sprocket in one plane and can operate tools which extend away from the said plane instead of extending to make a cut which is substantially in the same plane as the jib and sprocket. Such a chain has particular value in certain special connections as hereinafter described.

According to the present invention, a coal-cutter chain is provided of the type described wherein the sprocket-engaging faces on the links are formed on one of the sides of the links between the bases and tool-carrying bosses so as to receive the sprocket teeth in the side of the chain, and the means to connect the links together are such as to permit bending of the chain around the sprocket parallel to the plane of the base.

The means to connect the links together may comprise an eye at one end of each link, two ears at the other end thereof, the ears being spaced apart to receive the eye of the next link between them, and a hinge-pin to connect the eye and the ears together hingedly, the construction being such that the axes of the hinge-pins are transverse to the bases of the links, the sprocket-engaging faces of the links being made concentric with the hinge-pins.

Alternatively the means to connect the links together may comprise a ball member on one end of each link, a socket-member on the other end thereof adapted to receive the ball member of the next link, the ball member being carried on an overhung portion of the link, with a stem extending down therefrom toward the plane of the bases of the links, and the sprocket-engaging faces of the links being formed on the sides of the links concentrically with the ball-member.

The following is a description by way of example of certain constructions in accordance with the invention:

In the accompanying drawings,

Figure 1 is a side elevation showing two links of a chain;

Figure 2 is an end elevation of one link;

Figure 3 is a plan of a part of a sprocket and of three links of the chain in position thereon;

Figure 4:
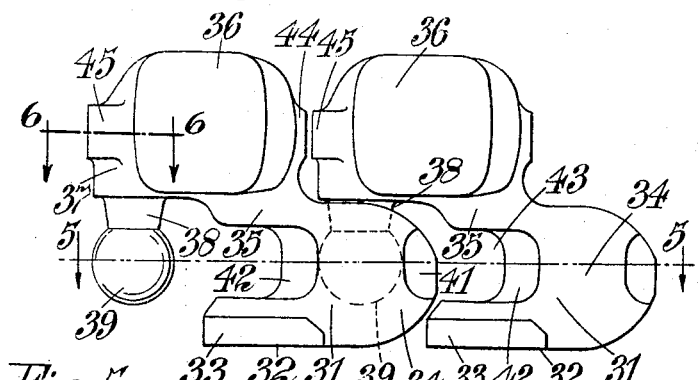
Figure 4 is a side elevation of an alternative construction.

Referring to the construction shown in Figures 1 to 3, this shows a coal-cutter chain made up of a series of forged alloy-steel pick-carrying links 11 having flat bases 12. Each link has two ears 13, 14 at one end which extend parallel to the bases 12 and are spaced apart one above the other and united by a web portion 15 at one end. Integral with the web 15 is an eye portion 16 at the other end of the link and the ears 13, 14 are spaced apart from one another sufficiently to receive the eye of the next link between them. Both eye and ears are pierced in a direction at right angles to the base to receive a hinge-pin 17 at each joint between the links. The holes for the hinge-pin in the eyes are bushed as shown at 18 and the hinge-pins are riveted flush in the ears 13, 14. The ears 13, 14 are made long enough to leave a space 19 between the end of the eye of one link and the web 15 of the next, and the portion of the web 15 which faces the space 19 is curved as shown at 20 concentrically with the bush 18 in the corresponding eye 16 of the link. The eye is curved concentrically about the bush over its portion which faces the aperture 19, as shown at 21, and the surfaces 20, 21 of the links form sprocket-engaging faces which, as can be seen in Figure 3, fit in the holes between the teeth 23 of the driving sprocket 24 when the chain passes around the sprocket. The apertures 19 between the links open right across the chain and so provide outlets for dirt and prevent clogging, and it will be noted that the hinge-pins 17, being at right angles to the bases 12, permit the chain to bend around the sprocket with the bases parallel to the plane of the sprocket which is in a direction at right angles to that of a usual type of chain. Usually the planes of the bases are parallel to the axis of the driving sprocket.

Each link has on its upper side a large tool-carrying boss 25. The tool-carrying bosses carry coal-cutter picks 26 the shanks of which enter slots in the bosses and are secured by set screws or otherwise in the usual manner. While two picks are indicated in Figure 1, the fixing means for the picks are not shown, being common practice, and in Figure 2, a number of alternative positions for the picks are indicated in the drawing, without the picks being drawn in full, because each tool-carrying boss in the chain is pierced differently so that the picks as a whole cover a considerable width of cut without requiring any one link to carry picks pointing in all the possible directions.

It will be noted that the ears 13 of each link enter recesses 28 below the backs of the tool-carrying bosses of the next link and the recesses and the ears are made to fit one another with only a small clearance. This prevents undue backlash in the chains. The ears 14 at the underside of the links similarly enter recesses 29.

It will be seen that, apart from the angles of the various slots to receive the picks 26, all the links of the chains are alike and therefore can be produced in the same dies, the only requirement special to each link being that it is machined out to meet pick-carrying requirements.

Figure 5:
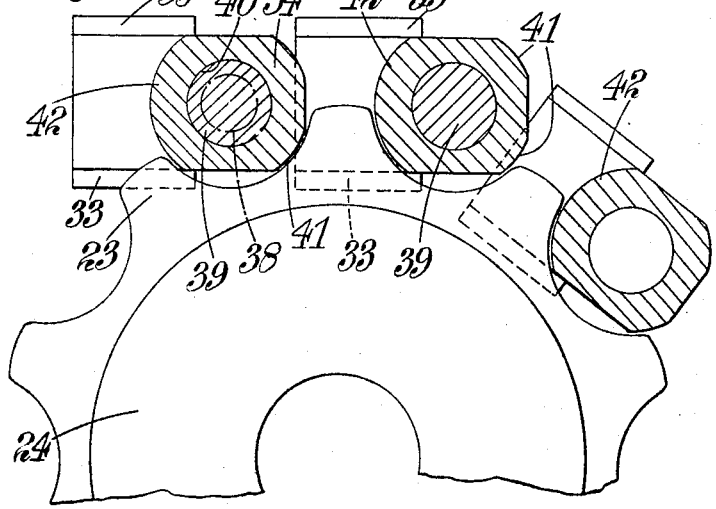
Figure 5 is a section in the plane 5—5 of Figure 4 looking in the direction of the arrows and showing the links mounted upon a sprocket; and, Fig. 6 is a fragmentary sectional view on the line 6—6 of Fig. 4.
Figure 6:
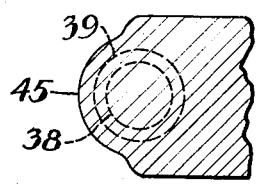

Referring now to Figures 4 and 5, these show a chain with a ball-joint connection between the links. The links 31 have flat bases 32 with lateral guides 33 to run in a jib or a coal-cutter, and at one end of each of the base portions there is a socket portion 34 which, in the present instance, comprises the main body of the link. From the top of the socket portion there is a rearward extension 35 on which is mounted a pick-box 36 similar to the pick-box 25 of Figures 1 to 3. The pick-box however is extended as shown at 37 and from it there depends a ball stem 38 carrying a ball 39. Each of the ball stems 38 with its ball 39 is capable of entering the socket 34 of the neighbouring link which is hollowed out as shown at 40, Figure 5, to fit the ball. The end of the socket portion 34 of the link is rounded off cylindrically as shown at 41, concentrically with the ball 39 and the other side of the socket where it overlies the base 32 is also rounded off cylindrically as shown at 42. Cylindrical surfaces 41, 42 form sprocket-engaging surfaces to engage the teeth 23 of the sprocket 24 as shown in Figure 5. Between the surfaces 41, 42 an aperture 43 corresponding to the aperture 19 of Figure 1 exists and through this dirt can escape. Thus the chain can run sideways on the sprocket 24 in a similar way to the running of the chain shown in Figures 1 to 3. To prevent reverse bending of the chain in a plane perpendicular to the flat surfaces of the several bases 32, the front and rear ends of the pick boxes are provided with adjoining pairs of cooperative cylindrical stop surfaces 44 and 45. However, in order to permit flexibility of the chain in a plane parallel to the surfaces of the several bases 32 and about the axes of the ball stems 38, the stop surfaces 45 at least are cylindrically curved concentrically with the axes of the stems 38 of their respective links. The arrangement is such that the stop surfaces 44 and 45 which are in adjoining relation in each pair are almost in contact with one another when the chain is running in a straight line whereby it may freely flex about the axes of the stems 38 but flexing in a direction parallel to said axes is limited by engagement between adjoining surfaces 44 and 45.

It will be understood that the sockets 34 may be provided with liners to fit the balls and the ball stems 38 may be separate from the overhanging pick-boxes and fitted thereto if desired.

I claim:

In a coal cutter chain the combination of a series of links each of which comprises a base portion, a socket portion above the base portion and integral with one end thereof, an upper portion extending from the upper part of the socket portion parallel with and above the base portion, a pick box on said upper portion, a ball carrying portion extending from said upper portion beyond the base portion, a ball stem depending from said upper portion, and a ball on the stem adapted to enter and fit in the socket portion of the next link of the chain, the socket portion of each link being rounded externally on both fore and aft faces thereof cylindrically about an axis which is at right angles to the base portion and concentric with the stem of the ball received in said socket portion, said socket portions of adjoining links being relatively spaced lengthwise of the chain to leave therebetween apertures for reception of sprocket teeth, said rounded faces being disposed for operative engagement with said sprocket teeth on opposite sides thereof, the front and rear ends of the pick box of each link being formed respectively with relatively oppositely directed stop faces, said stop face at one end of the pick box being curved about the axis of the ball stem of its respective link and each such curved stop face being closely adjacent a stop face of an adjoining link.

References Cited in the file of this patent

UNITED STATES PATENTS

| | | |
|---|---|---|
| 1,325,030 | Morgan | Dec. 16, 1919 |
| 2,091,836 | Sayers et al. | Aug. 31, 1937 |
| 2,305,298 | Lewis | Dec. 15, 1942 |
| 2,566,675 | Proctor | Sept. 4, 1951 |